(12) United States Patent
Krishnegowda et al.

(10) Patent No.: US 12,306,954 B2
(45) Date of Patent: *May 20, 2025

(54) SYSTEMS, METHODS, AND DEVICES FOR SECURED NONVOLATILE MEMORIES

(71) Applicant: Infineon Technologies LLC, San Jose, CA (US)

(72) Inventors: Sandeep Krishnegowda, San Jose, CA (US); Zhi Feng, Fremont, CA (US)

(73) Assignee: Infineon Technologies LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,627

(22) Filed: Mar. 6, 2024

(65) Prior Publication Data

US 2025/0077677 A1 Mar. 6, 2025

Related U.S. Application Data

(63) Continuation of application No. 17/359,131, filed on Jun. 25, 2021, now Pat. No. 11,954,206.

(60) Provisional application No. 63/157,185, filed on Mar. 5, 2021.

(51) Int. Cl.
  G06F 21/57    (2013.01)
  G06F 3/06     (2006.01)
  G06F 9/4401   (2018.01)
  G06F 13/16    (2006.01)

(52) U.S. Cl.
  CPC .......... *G06F 21/575* (2013.01); *G06F 3/0623* (2013.01); *G06F 3/0659* (2013.01); *G06F 3/0679* (2013.01); *G06F 9/4403* (2013.01); *G06F 13/1668* (2013.01); *G06F 2221/034* (2013.01)

(58) Field of Classification Search
  CPC .... G06F 21/575; G06F 3/0623; G06F 3/0659; G06F 3/0679; G06F 9/4403; G06F 13/1668; G06F 2221/034
  See application file for complete search history.

(56) References Cited

U.S. PATENT DOCUMENTS

| | | | |
|---|---|---|---|
| 8,239,673 B2* | 8/2012 | Shankar ............... | G06F 21/575 713/193 |
| 9,448,918 B2* | 9/2016 | Feinberg ........... | H04N 1/00137 |
| 10,691,807 B2* | 6/2020 | Hershman ............ | G06F 13/362 |

(Continued)

*Primary Examiner* — Hosuk Song

(57) ABSTRACT

Systems, methods, and devices securely boot processors and nonvolatile memories. Methods include implementing, using a controller of a secured nonvolatile memory, a validation operation on a first portion of code stored in a first secured storage region of the secured nonvolatile memory, the validation operation comprising computing a validation value. Methods also include retrieving a second portion of code from a second secured storage region, the second portion of code comprising a pre-computed validation value, the first and second portion of code being associated with booting a processor, and implementing a comparison operation of the validation value and the pre-computed validation value. Methods further include generating, using the controller, a signal based on a result of the comparison operation, the signal being provided to the processor via an interface of the secured nonvolatile memory, and the signal enabling booting of the processor in response to a matching comparison operation.

20 Claims, 6 Drawing Sheets

(56) References Cited

U.S. PATENT DOCUMENTS

| | | | |
|---|---|---|---|
| 10,984,136 B2 * | 4/2021 | Dover | G06F 21/78 |
| 11,520,494 B2 * | 12/2022 | Kloth | G06F 3/0679 |
| 11,768,611 B2 * | 9/2023 | Kloth | H04L 9/14 |
| | | | 713/2 |
| 11,954,206 B2 * | 4/2024 | Krishnegowda | G06F 3/0659 |

* cited by examiner

SYSTEMS, METHODS, AND DEVICES FOR SECURED NONVOLATILE MEMORIES

CROSS-REFERENCE TO RELATE APPLICATIONS

This application is a continuation application of U.S. Non-Provisional application Ser. No. 17/359,131 filed Jun. 25, 2021, which claims the benefit of priority under 35 U.S.C 119 § (e) of U.S. Provisional Patent Application No. 63/157,185 filed Mar. 5, 2021, which both applications are incorporated herein by reference in each of its entirety for all purposes.

TECHNICAL FIELD

This disclosure generally relates to nonvolatile memories, and more specifically, to secured boot operations associated with nonvolatile memories.

BACKGROUND

Processors may undergo various processes when commencing operation and being initialized. For example, a processor may undergo one or more boot operations when being initialized, and when associated software is being loaded and initialized. For example, a boot loader may be used to implement such boot operations. Accordingly, the boot loader may be boot code that handles the loading of information that may be used by the processor and applications associated with the processor. The boot loader may be a multi-stage boot loader. For example, the boot loader may have a first stage and a second stage. Conventional processors remain limited in their ability to implement such multi-stage boot loaders while ensuring the boot process remains secure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Processors may utilize boot loaders and boot code to implement boot operations. However, processors, such as application processors and microcontrollers, might not include internal nonvolatile memories, and may use external nonvolatile memory devices to store such boot loaders and boot code. Accordingly, conventional application processors may have to rely on unsecured external memory devices for boot operations. Moreover, synchronization between the memory device and the processor might not be possible as the memory device may be outside a trusted environment or zone, and may be unsecured. Accordingly, conventional processors and memory devices remain limited in their ability to implement such boot operations in a secured manner.

More specifically, when a memory device is outside a trusted environment or zone, contents of the memory device are copied from the unsecured memory device outside a processor to static random-access memory (SRAM) inside the processor, and checked for integrity before it is executed. Such operations add delay when powering up a processor or microcontroller, and also make possible denial of service attacks because the data in external memory device may be modified. In such situations, if a processor is hacked, roll back attacks may be executed because the memory device is not secured.

Embodiments disclosed herein enable the secured initialization and operation of processors, such as application processors. As will be discussed in greater detail below, a secured portion of a memory device, which may be a secured storage region such as a Root of Trust (RoT), may be used to handle validation of boot operations, and an interface of a memory module including the secured portion may be used to synchronize boot events and code validation with the processor. In this way, a secured region of the memory device may be used to ensure security of the boot process, and the memory device may be configured to enable operation of the processor when such validation and boot operation is complete. In some embodiments, such operations may be synchronized with powering up of one or more components of a system on a chip (SoC), thus reducing delay of the secured boot process.

Figure 1:
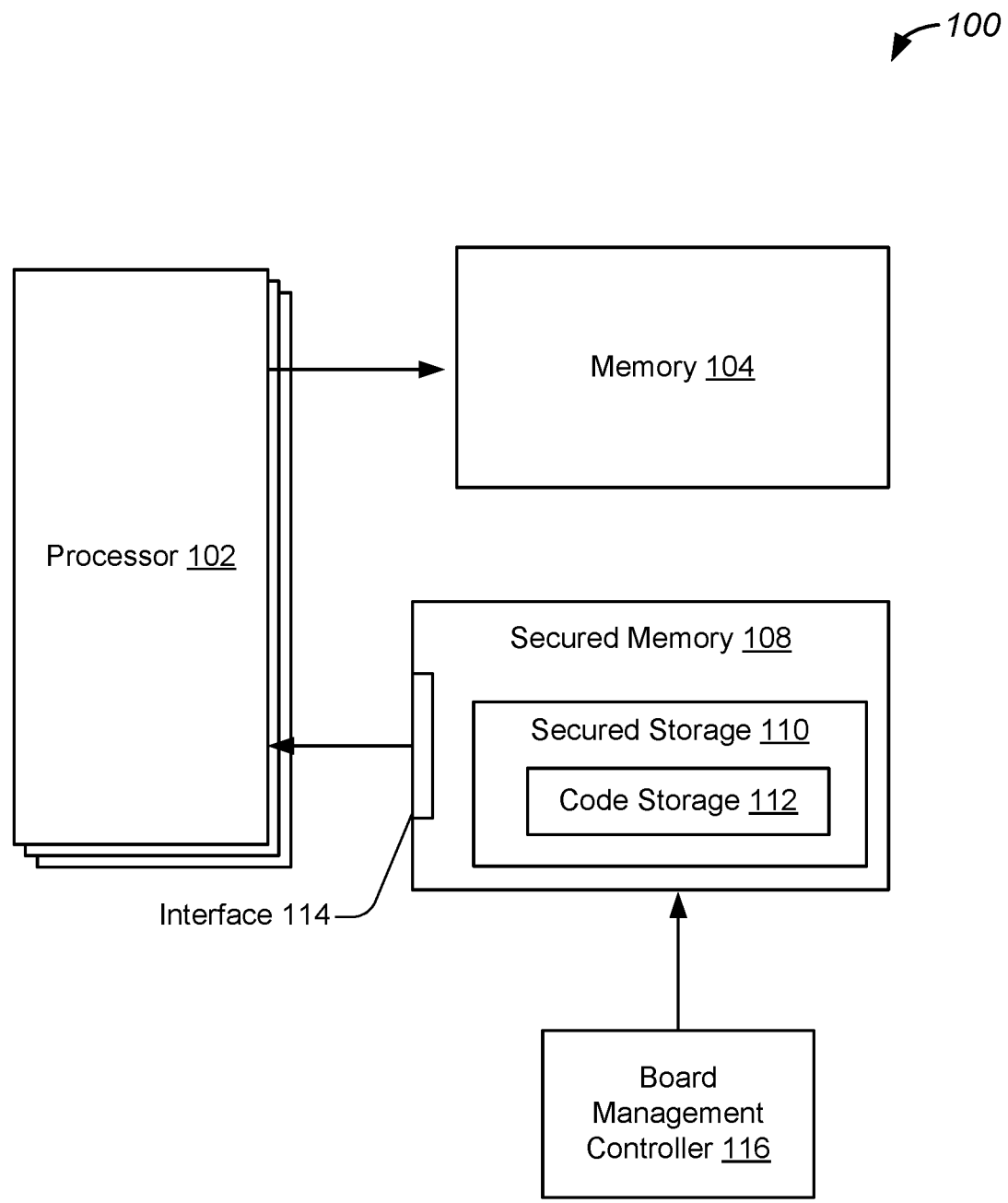
FIG. 1 illustrates an example of a system for secured nonvolatile memory, configured in accordance with some embodiments.

FIG. 1 illustrates an example of a system for secured nonvolatile memory, configured in accordance with some embodiments. As will be discussed in greater detail below, a system, such as system 100 may utilize a secured processing environment of a secured memory module to implement validation operations for a booting process of a processor. Moreover, the secured memory module may be configured to generate and send a signal to the processor during the booting process to facilitate management of the processor during validation operations of the booting process.

System 100 includes processor 102, which may be an application processor. Accordingly, processor 102 may be configured to execute processing operations and support an operating environment for one or more applications. In one example, processor 102 may be a mobile application processor. In some embodiments, processor 102 may be implemented via a system on a chip (SoC) or other suitable processing hardware, such as an integrated circuit (IC) package. It will be appreciated that processor 102 may be any suitable type of processor. As will be discussed in greater detail below, processor 102 may be initialized using one or more boot operations stored in boot code that may be handled by a boot loader. In various embodiments, system 100 may also include a memory device, such as memory 104, that may store data accessed by processor 102. In various embodiments, memory 104 is configured to be communicatively coupled with processor 102 via an interface, such as a dynamic random-access memory (DRAM) interface.

In various embodiments, system 100 additionally includes a secured memory module, such as secured memory 108 that is configured to communicate with processor 102 via interface 114. Accordingly, as will be discussed in greater detail below, secured memory 108 may be configured to implement validation and comparison operations during a booting process of processor 102, and may also be configured to generate and send a signal to processor 102 via interface 114 that facilitates the management of processor 102 during the boot process and operations associated with the boot process. More specifically, the signal may be used to hold processor 102 in a reset state during secured boot operations. Moreover, interface 114 may be a general-purpose input/output (GPIO) interface, and the signal may be sent to processor 102 via a pin of the GPIO. In some embodiments, interface 114 may be a quad serial peripheral interface (QSPI).

In various embodiments, secured memory 108 is configured to implement a Root of Trust (RoT) for a storage region, such as secured storage 110. Accordingly, secured memory 108 may be configured to provide a trusted memory space that is always trusted by other system components, such as processor 102. Accordingly, secured memory 108 may include one or more storage regions, such as secured storage 110, that are always encrypted, thus maintaining a secured data processing environment. Additional details regarding secured memories are discussed in greater detail below with reference to at least FIG. 2 and FIG. 3. In various embodiments, secured memory 108 additionally includes code storage 112 which may be configured to store additional code underlying validation and comparison operations, as will be discussed in greater detail below. For example, code storage 112 may be configured to store boot code, such as one or more stages of a boot loader, as well as application code. Moreover, code storage 112 may also be a secured storage region that is included in the RoT.

System 100 additionally includes board management controller 116 that may be a memory controller configured to control the operation of components of secured memory 108. Accordingly, as will be discussed in greater detail below, validation operations, comparison operations, and generation of signals may be managed by board management controller 116. Thus, board management controller 116 may instruct secured memory 108 to implement one or more processing operations, and such processing operations may be implemented within the secured processing environment provided by the RoT of secured memory 108. As will be discussed in greater detail below, such processing operations may be used to authenticate boot code as well as associated application code, thus enabling secured memory 108 to authenticate boot operations and manage the booting process of processor 102. Additional details of the secured boot operations are discussed in greater detail below.

Figure 2:
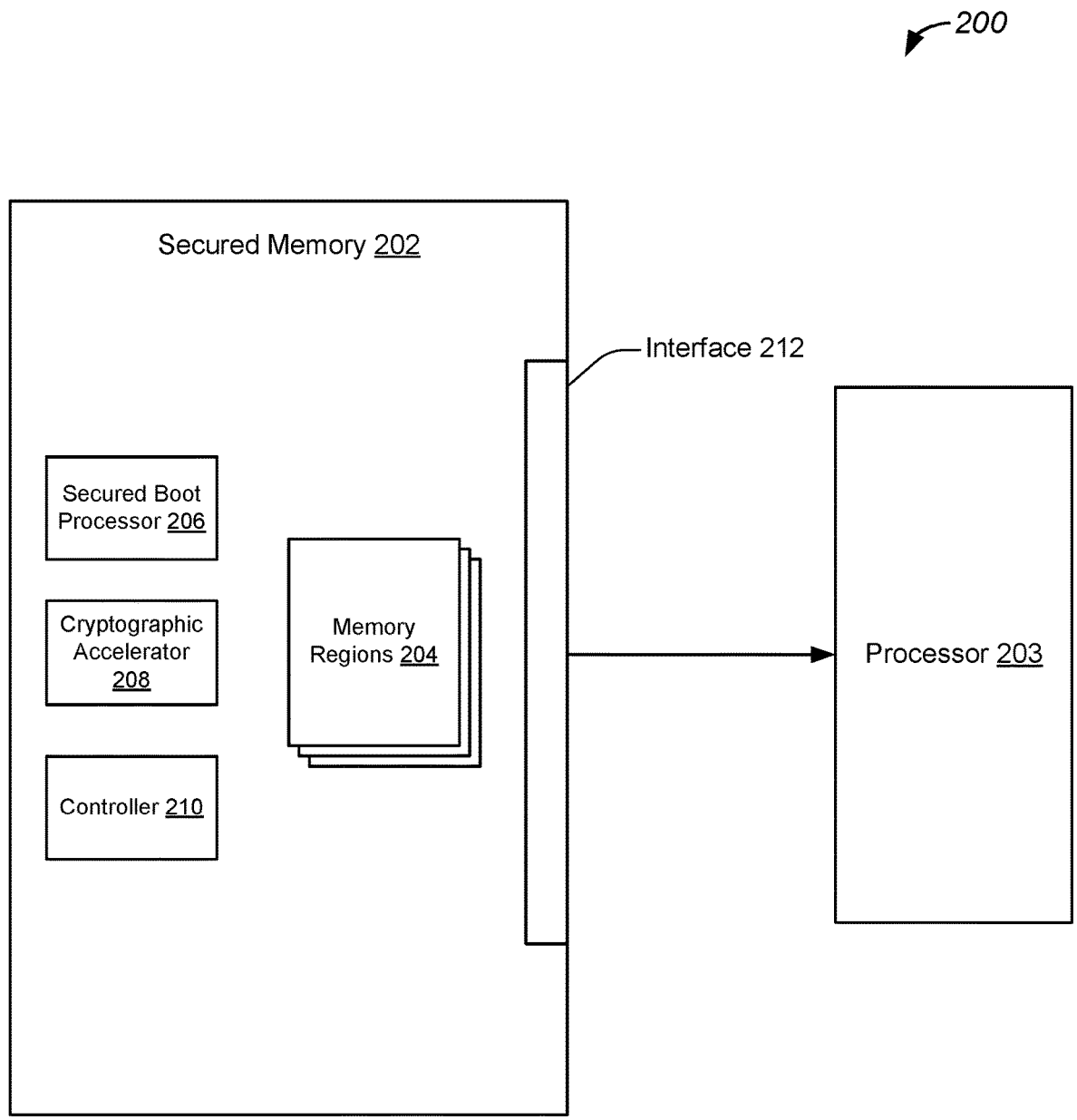
FIG. 2 illustrates an example of another system for secured nonvolatile memory, configured in accordance with some embodiments

FIG. 2 illustrates an example of another system for secured nonvolatile memory, configured in accordance with some embodiments. As similarly discussed above, secured memories may be used to provide secured environments for validation and comparison operations during a booting process of a processor. In various embodiments, a system, such as system 200 may utilize a secured processing environment of a secured memory module to implement such validation and comparison operations. As will be discussed in greater detail below, a secured memory module, such as secured memory 202, may be configured to include various components to provide a secured processing environment, such as an RoT, and also generate signals used to facilitate management of a processor, such as processor 203, during secured operations of the booting process.

Accordingly, system 200 includes secured memory 202 which is configured to provide a secured processing environment, such as an RoT, that is always trusted by other system components, such as processor 203. As shown in FIG. 2, secured memory 202 is configured to include various components used to implement the secured processing environment. More specifically, secured memory 202 is configured to include secured boot processor 206 which is a processor specifically configured to implement booting operations for secured memory 202, thus allowing secured memory 202 to self-initialize and self-authenticate.

Secured memory 202 additionally includes cryptographic accelerator 208 which is a processing device specifically configured to implement one or more cryptographic operations. More specifically, cryptographic accelerator 208 is configured to implement encryption and decryption operations for data stored within secured memory 202. In some embodiments, cryptographic accelerator 208 is further configured to compute various validation values that may be integrity check values, such as hash values, cyclic redundancy check (CRC) values, or keyed-hash message authentication codes (HMACs). In one example, cryptographic accelerator 208 is configured to support and implement an elliptic curve digital signature algorithm (ECDSA) as well as public keys used for ECDSA-based authentication. It will be appreciated that cryptographic accelerator may be configured to compute any suitable type of validation value.

Secured memory 202 further includes controller 210 which is configured to implement one or more processing operations for secured memory 202.

Accordingly, controller 210 may include one or more processing elements that are configure to implement processing operations, such as boot operations and comparison operations not handled by cryptographic accelerator 208. Therefore, controller 210 may be configured as a memory controller integrated into a memory module of secured memory 202. While controller 210 is discussed separately from secure boot processor 206, it will be appreciated that controller 210 and secure boot processor 206 may be implemented as a single component of secured memory 202. In various embodiments, secured memory 202 also includes memory storage regions, such as memory regions 204. As will be discussed in greater detail below, memory regions 204 may be user-defined and may be configured to store various data used during the booting process, such as boot code and application code.

System 200 additionally includes processor 203 which is configured to implement various processing operations. As discussed above, processor 203 may be an application processor that has associated boot code and application code. Moreover, processor 203 is communicatively coupled to secured memory 202 via interface 212 which may be a GPIO interface of secured memory 202. Accordingly, processor 203 may receive signals from secured memory 202 via one or more pins of interface 212.

Figure 3:
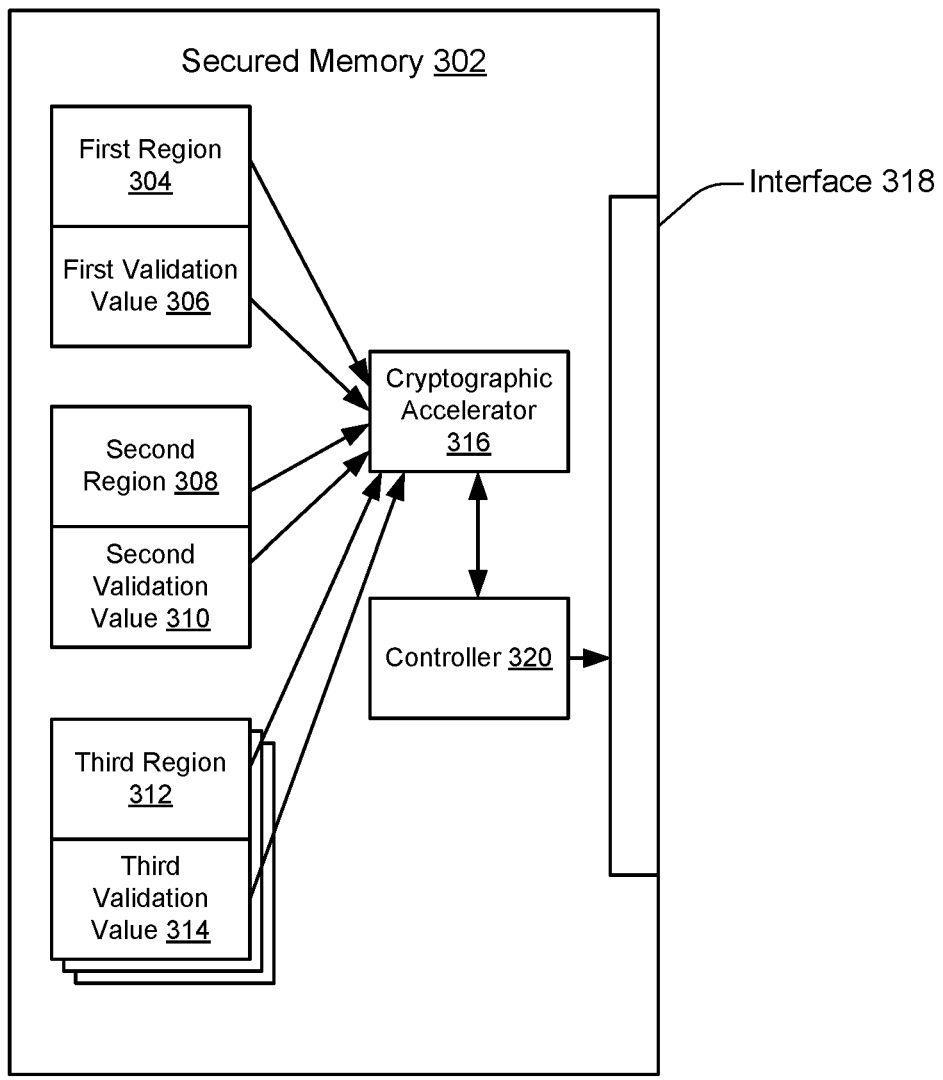
FIG. 3 illustrates an example of a device for secured nonvolatile memory, configured in accordance with some embodiments

FIG. 3 illustrates an example of a device for secured nonvolatile memory, configured in accordance with some embodiments. As similarly discussed above, secured memories may be used to provide secured environments for validation and comparison operations during a booting process of a processor. In various embodiments, a system, such as system 200 may memory module that includes multiple storage regions used to support secured boot operations for multiple processors. Accordingly, as will be discussed in greater detail below, a secured memory module, such as secured memory 302, may be configured to include various components configured to implement secured boot operations and to generate signals for the multiple processors.

In various embodiments, secured memory 302 includes multiple memory regions configured to store code and validation values within each of the multiple regions. For example, secured memory 302 may include first region 304 and validation value 306. In various embodiments, first region 304 is a first code region that is defined by an entity, such as a user, to store software code, such as an initial boot loader (IBL), second-stage bootloader (SBL), or application code. The user may also define which code regions are to be authenticated. In this way, each code region may be user-defined storage region that has user-defined validation parameters identifying whether or not validation should be implemented. The validation parameters may also identify a type of validation operation that is to be implemented. Accordingly, a user may identify a type of validation, such as a hash operation, CRC, or HMAC, that is to be used. The contents stored in first region 304 may have been previously stored by an entity, such as a user, during an initialization operation in which boot code is loaded. In some embodiments, contents stored in first region 304 may have been retrieved from another region, such as a separate memory storage region. In various embodiments, validation value 306 is computed and stored during programming of first region 304. Accordingly, validation value 306 may provide a reference value during a boot operation, such as a comparison operation as will be discussed in greater detail below.

Secured memory 302 additionally includes second region 308, comparison value 310, third region 312, and third validation value 314. As discussed above, such regions may be, at least in part, user-defined, and such validation values may be stored during programming of such regions. In this way, secured memory 302 includes regions and validation values for multiple different processors, and may be used to manage the secured boot of multiple different processors sequentially and/or concurrently. Furthermore, while three regions are shown in FIG. 3, it will be appreciated that any number of regions may be included. Moreover, any number of processors may be mapped to such regions, and thus supported by secured memory 302. For example, four processors may be supported with four regions, or eight processors may be supported with eight regions.

Secured memory 302 further includes cryptographic accelerator 316 which, as discussed above, is a processing device configured to implement one or more validation operations. Accordingly, cryptographic accelerator 316 may be configured to retrieve code from regions of secured memory 302 and compute validation values for such code. In one
example, cryptographic accelerator 316 may be configured to retrieve code from first
region 304 and compute a validation value for the retrieved code by applying one or more validation operations to the code. As discussed above, the one or more validation operations may have been previously identified by an entity, such as a user, and may include operations such as the computation of a hash value or a HMAC value.

The validation value computed by cryptographic accelerator 316 may be passed to controller 320 which may be configured to compare the computed validation value with contents of validation value 306. In this way, the contents of first region 304 may be compared and authenticated against the reference value stored in validation value 306. If the values match, the comparison is determined to be successful, and additional operations, such as the generation of a signal, may occur, as discussed in greater detail below. If the values don't match, the comparison is determined to not be successful, and the boot operation does not continue. In some embodiments, if the comparison is determined to not be successful, an alternate boot process may be implemented. For example, a notification message may be generated, or an alternate boot operation may be implemented from a different storage region.

As discussed above, controller 320 may comprise one or more processing elements that are configured to generate a signal in response to a matching validation operation. More specifically, the signal may be a trigger signal that is configured to cancel a reset state of a processor associated with the validation operation. For example, a first processor associated with first region 304 may have been set to a reset state at the onset of a boot process. In some embodiments, the reset state may be set via an output of interface 318 that may be coupled to a reset input of the processor, and a reset signal may be asserted by controller 320 to set the processor to the reset state. Once a successful validation operation has been completed, controller 320 may generate a trigger signal that cancels the reset signal and enables the processor to commence booting operations. In various embodiments, such trigger signals may be generated for multiple processors and provided to the multiple processors via interface 318.

As discussed above, interface 318 may be a GPIO interface, and different trigger signals may be transmitted via different pins of the GPIO interface. In some embodiments, the specific GPIO pins used may be programmable. Accordingly, a user may configure one or more data values stored in GPIO registers included in the GPIO interface, and the user may define which GPIO pin is associated with which processor, and used to manage boot operations for that processor. Such programming may occur via one or more components of a memory interface, such as a serial peripheral interface (SPI), inter-integrated circuit (I2C) interface, or embedded multimedia card (eMMC) interface. In this way, programming and generation of trigger signals may be in-band and accomplished using an existing memory interface, or may be out-of-band and accomplished using a secondary memory interface.

In various embodiments, interface 318 is an output only interface.
Accordingly, interface 318 may be an interface configured to provide only outputs, and have no input. According to some embodiments, interface 318 may be any suitable interface used to transmit a signal from secured memory 302 to a processor. Moreover, as discussed above, management of processors and generation and transmission of trigger signals may be implemented sequentially or in parallel. Additional details regarding the generation of trigger signals is discussed in greater detail below with reference to FIGS. 4-6.

Figure 4:
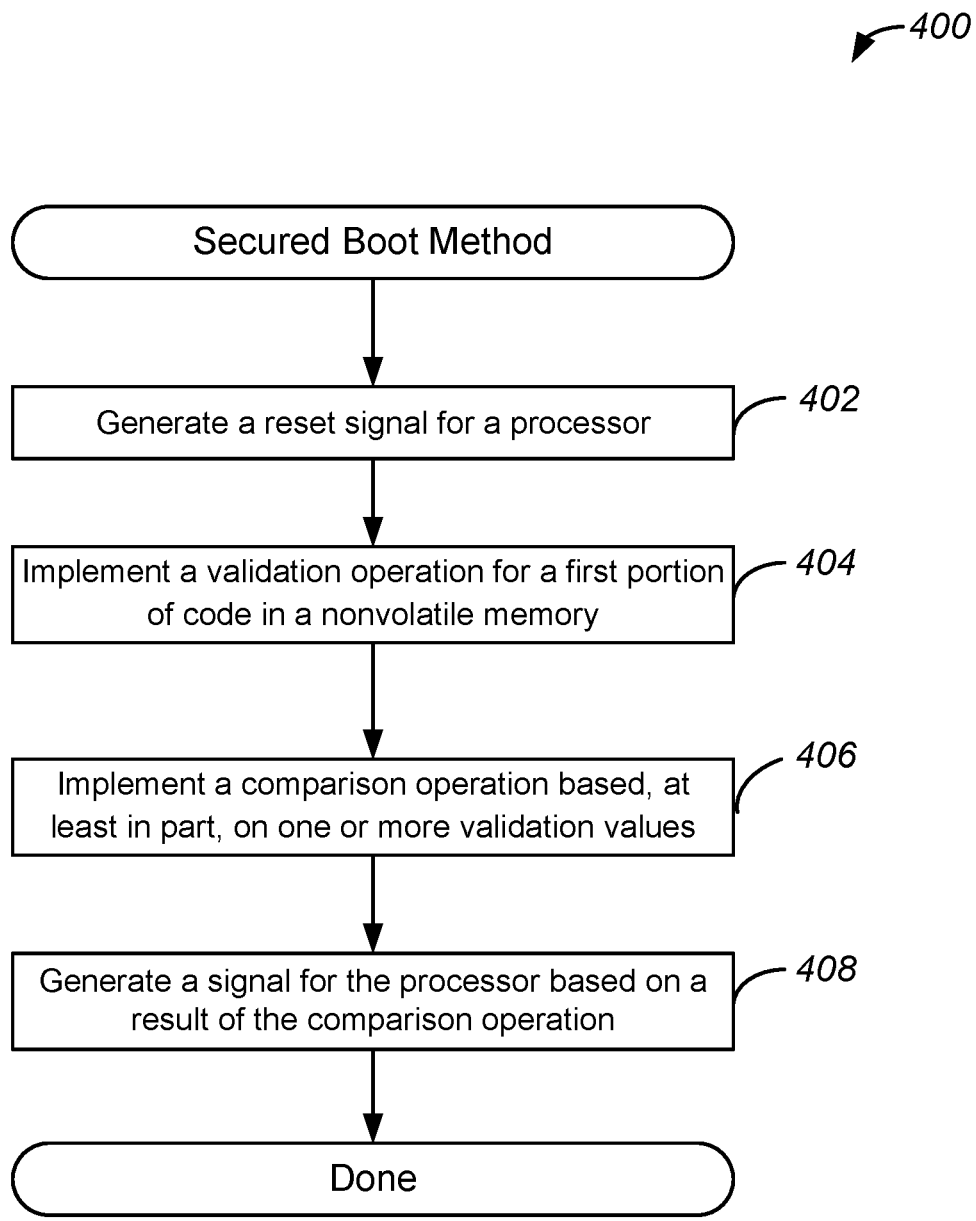
FIG. 4 illustrates an example of a method for secured boot of a nonvolatile memory, implemented in accordance with some embodiments.

FIG. 4 illustrates an example of a method for secured boot of a nonvolatile memory, implemented in accordance with some embodiments. As discussed above, secured memories may be used to provide secured environments for validation and comparison operations during a booting process of a processor. As will be discussed in greater detail below, a method, such as method 400, may be implemented to authenticate boot code and application code for one or more processors. More specifically, a secured portion of a secured memory module may be used to manage such boot operations, thus ensuring a secured boot of the one or more processors.

Accordingly, method 400 may commence with operation 402 during which a reset signal may be generated for a processor. As similarly discussed above, a processor that is being securely booted may initially be set to a reset state via the assertion of a signal provided to a reset input of the processor. The signal may be generated by a secured memory and transmitted via an interface, such as a GPIO interface. In various embodiments, setting the processor to the reset state stalls operation of the processor and allows the secured memory to manage the boot process, and implement secured boot operations that include validation and comparison operations, as will be discussed in greater detail below.

Method 400 may proceed to operation 404 during which a validation operation may be implemented for a first portion of code. In various embodiments, the validation operation may be a computation of a validation value for code stored in the secured memory. As discussed above, the computation of the validation value may include computing a hash value of code stored in a storage region of the secured memory that resides in the RoT. As also discussed above, the first portion of code may be a portion of a boot loader, or may be application code. The contents of the first portion of code may be user-defined, and may have been previously programmed.

Method 400 may proceed to operation 406 during which a comparison operation may be implemented based, at least in part, on one or more validation values.

Accordingly, the validation value computed during operation 404 may be compared against an additional validation value stored in another storage region of the secured memory. The additional validation value may be a previously computed and stored validation value that was computed and stored when then the first portion of code was initially stored. Accordingly, during operation 406, the validation value computed during operation 404 may be compared against the previously stored validation value to see if they match, or if the first portion of code has changed. In various embodiments, a comparison operation is considered successful if the compared validation values match.

Method 400 may proceed to operation 408 during which a signal may be generated for the processor based on a result of the comparison operation. Accordingly, in response to the validation values matching and the comparison operation being successful, the secured memory may generate a signal that is transmitted to the processor via the interface. The signal may be a trigger signal that cancels the reset state of the processor and triggers initialization and operation of the processor. In this way, the secured memory may implement secured boot operations, and may control the operation of a processor to manage a secured boot of the processor.

Figure 5:
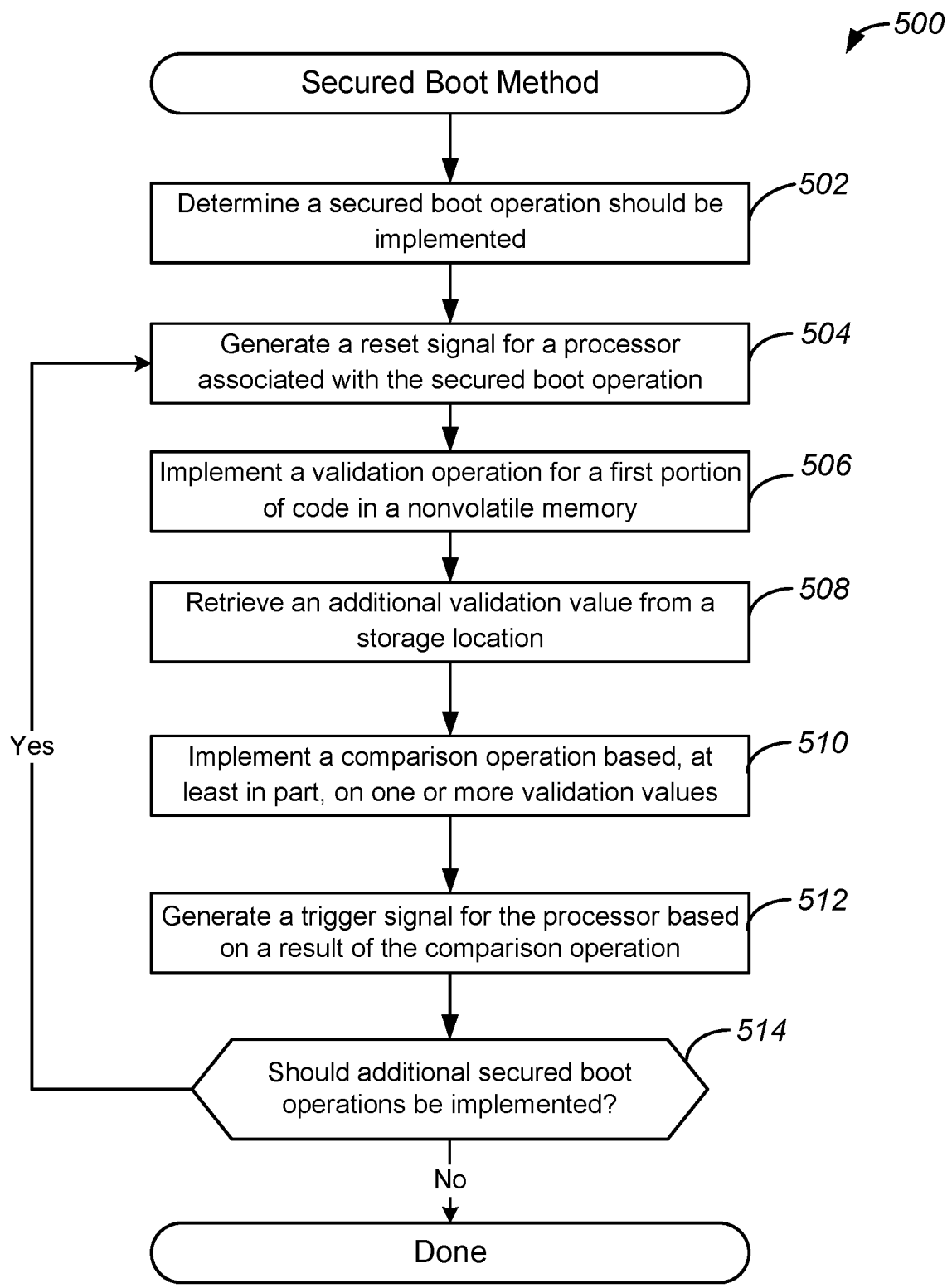
FIG. 5 illustrates an example of another method for secured boot of a nonvolatile memory, implemented in accordance with some embodiments.

FIG. 5 illustrates an example of another method for secured boot of a nonvolatile memory, implemented in accordance with some embodiments. As discussed above, secured memories may be used to provide secured environments for validation and comparison operations during a booting process of a processor. As will be discussed in greater detail below, a method, such as method 500, may be implemented to authenticate boot code and application code for one or more processors. Accordingly, a secured portion of a secured memory module may be used to manage boot operations for multiple processors via an interface of the secured memory module.

Accordingly, method 500 may commence with operation 502 during which it may be determined that a secured boot operation should be implemented. In various embodiments, such a determination may be made in response to receiving a signal or identifying one or more conditions from other system components. For example, a signal may be received from another system component indicating that an application it to be executed, and an application processor should be initialized to support the application. In another example, the signal may be received from another system component identifying a system event, such as an initial powering up and booting of a device. Accordingly, during operation 502, a processor and/or a secured memory module may receive a signal or identify one or more conditions that indicate a processor should be booted.

In various embodiments, the secured memory module may also implement one or more self-validation operations in response to determining that a secured boot operation should be implemented. Accordingly, the memory module may authenticate a portion of its own code, such as its own boot code, during operation 502, and such validation operations may be implemented within the secured region that is the RoT. In some embodiments, the validation operations may include comparing a computed validation value with a previously stored validation value, as similarly discussed below.

Method 500 may proceed to operation 504 during which a reset signal may be generated for a processor. As similarly discussed above, a processor that is being securely booted may initially be set to a reset state by a secured memory module. Accordingly, during operation 504, a component of the secured memory module may generate a reset signal and may provide the reset signal to a reset input of the processor. As also noted above, the signal may be transmitted via an interface, such as a GPIO interface. More specifically, a specific pin of the GPIO interface may be associated with the processor being booted, and that pin may be used to transmit the reset signal. In various embodiments, setting the processor to the reset state stalls operation of the processor and allows the secured memory to manage the boot process, and implement validation and comparison operations while the processor is stalled, and before the processor actually boots.

Method 500 may proceed to operation 506 during which a validation operation may be implemented for a first portion of code. In various embodiments, the validation operation may be a computation of a validation value for code stored in the secured memory. As discussed above, the computation of the validation value may include computing a hash value of code stored in a storage region of the secured memory that resides in the RoT. The validation value may be any suitable value, such as a CRC value or a HMAC value. As also discussed above, the first portion of code may be a portion of a boot loader, or may be application code. Moreover, the contents of the first portion of code may be user-defined, and may have been previously programmed.

Method 500 may proceed to operation 508 during which an additional validation value may be retrieved from a secured storage region. As noted above, the additional validation value may be stored in another storage region of the secured memory. The additional validation value may be a previously computed and stored validation value that was computed stored when then the first portion of code was initially stored.

Accordingly, the additional validation value may have been previously computed during initialization and configuration of the secured memory module, and may be used as a reference to ensure the current code of the first portion of code has not been modified.

Method 500 may proceed to operation 510 during which a comparison operation may be implemented. In various embodiments, the validation value computed during operation 506 may be compared against the validation value retrieved during operation 508. Accordingly, during operation 510, it may be determined if the validation value computed during operation 506 matches the validation value retrieved during operation 508, or if they do not match, and the comparison provides an indication that the first portion of code has changed. In one example, both validation values may be hash values. Accordingly, a system component, such as a controller, may determine if the hash values are the same.

Method 500 may proceed to operation 512 during which a trigger signal may be generated for the processor based on a result of the comparison operation. Accordingly, in response to the validation values matching and the comparison operation being successful, the secured memory may generate a trigger signal that is transmitted to the processor via the interface. The trigger signal may be configured to cancel the reset state of the processor and to trigger initialization and operation of the processor. Accordingly, during operation 512, the trigger signal may be generated and transmitted via the pin associated with the processor being booted. In this way, the secured memory may implement validation and comparison operations within its RoT and control the operation of a processor to manage a secured boot of the processor. It will be appreciated that if the comparison operation discussed above in operation 510 does not identify a match, then the trigger signal is not generated during operation 512. Accordingly, operation 512 may be implemented optionally, and conditioned upon a result of operation 510.

Method 500 may proceed to operation 514 during which it may be determined if additional boot operations should be implemented. In one example, such a determination may be made based on a number of processors being managed by the secured memory module. More specifically, it may be determined if other processors are being managed by the secured memory module and should also be securely booted. In some embodiments, such a determination may be made based on an implementation of a state machine or a queue of boot commands.

In one example, such a determination may be made based on a sequence of operations included in a boot process. For example, boot code may comprise multiple boot stages that are validated and executed sequentially. Accordingly, the first portion of code discussed above may have been a first stage of a boot loader. Thus, it may be determined that a second stage of a boot loader is to be validated next, and additional secured boot operations should be implemented. In this way, multiple secured boot operations may be implemented sequentially, and with a chain of trust where a successive secure boot operation is only implemented if a previous one was successfully validated. Accordingly, during operation 514, if it is determined that additional boot operations should be implemented, method 500 may return to operation 504. If it is determined that no additional boot operations should be implemented, method 500 may terminate.

Figure 6:
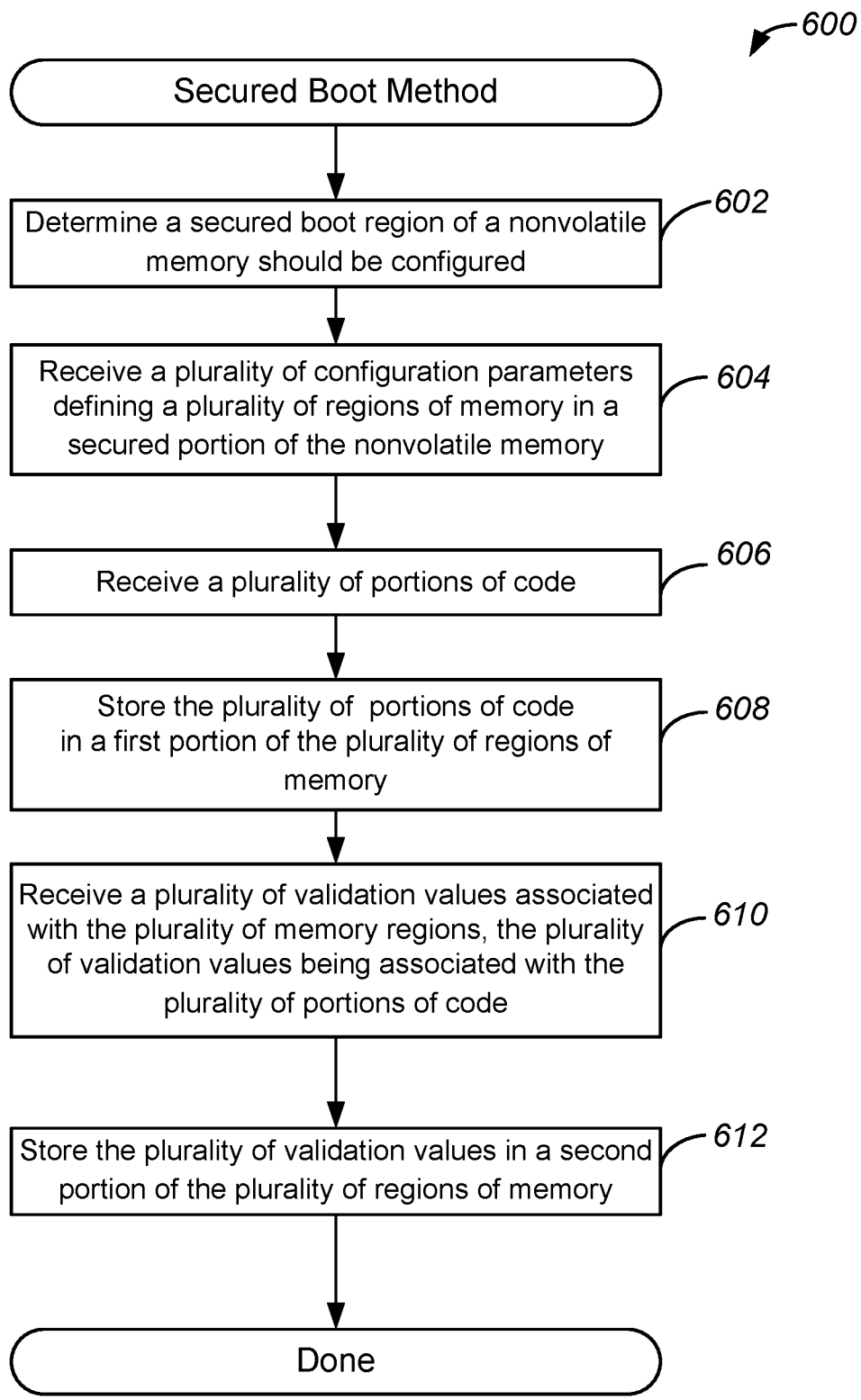
FIG. 6 illustrates an example of yet another method for secured boot of a nonvolatile memory, implemented in accordance with some embodiments.

FIG. 6 illustrates an example of yet another method for secured boot of a nonvolatile memory, implemented in accordance with some embodiments. As discussed above, secured memories may be used to provide secured environments for validation and comparison operations during a booting process of a processor. As will be discussed in greater detail below, a method, such as method 600, may be implemented to configure a secured memory module to implement validation and comparison operations underlying secured boot operations. More specifically, a secured portion of a secured memory module may be specifically configured to manage such boot operations, thus ensuring a secured boot of the one or more processors.

Accordingly, method 600 may commence with operation 602 during which it may be determined that a secured boot region of a secured memory module should be configured. In various embodiments, such a determination may be made in response to receiving a signal indicating the secured memory module is to be configured.

Accordingly, such a signal may be received during an initial configuration of the secured memory, and may be received by a component of the secured memory, such as a controller.

Method 600 may proceed to operation 604 during which a plurality of configuration parameters may be received. In some embodiments, the plurality of configuration parameters may define a plurality of regions of memory in the secured memory. Accordingly, as discussed above, a portion of the secured memory included in the RoT may be dedicated to storing code used for secured boot operations. As also discussed above, parameters of the portion may be user-defined. Accordingly, during operation 604, the configuration parameters may be defined by a user, and may be provided to the secured memory. Moreover, the user may have defined a number of secured memory regions to be used for a particular number of processors, and such information may be stored in the configuration parameters. Moreover, the user may also configure aspects of usage of an interface of the secured memory. More specifically, the user may define which processor is associated with which component of an interface, such as a pin of a GPIO interface.

Method 600 may proceed to operation 606 during which a plurality of portions of code may be received. Accordingly, as discussed above, memory regions may have been defined such that each processor supported by the secured memory is provided a first and second region in the secured memory. Thus, during operation 606, code that is to be authenticated may be received from an entity, such as a user. As noted above, the code may be boot loader code associated with a first or second stage of a boot loader, or the code may be application code.

Method 600 may proceed to operation 608 during which the plurality of portions of code may be stored in a first portion of the plurality of regions of memory. Accordingly, during operation 608, code received for each processor may be stored in a first region that has been defined for that processor. As noted above, the first region is included in the RoT of the secured memory.

Method 600 may proceed to operation 610 during which a plurality of validation values may be received. As similarly discussed above, validation values may be pre-computed for the portions of code discussed above with reference to operation 606. Accordingly, during operation 610, the pre-computed validation values may be received from an entity, such as a user. In some embodiments, the pre-computed validation values may be generated by the secured memory itself. For example, a component of the secured memory may automatically generate the validation values during the initial configuration of the secured memory.

Method 600 may proceed to operation 612 during which the plurality of validation values may be stored in a second portion of the plurality of regions of memory. Accordingly, during operation 612, a validation value received for each portion of code and its associated processor may be stored in a second region that has been defined for that processor. As noted above, the second region is included in the RoT of the secured memory. In this way, a secured memory may initially be configured, and contents of the secured memory may be updated to support subsequent secured boot operations.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method, comprising:
    initiating a secured boot operation of a processor;
    retrieving a first code stored in a first storage region of a nonvolatile memory (NVM) device coupled to the processor, wherein the first code is associated with the secured boot operation of the processor;
    computing, using a cryptographic accelerator, a first validation value based on the first code retrieved;
    retrieving a first pre-computed validation value from a second storage region of the NVM device, wherein the first pre-computed validation value is associated with the first code;
    implementing a comparison operation of the first validation value and the first pre-computed validation value;
    generating a first signal based on a result of the comparison operation, wherein the first signal enables the secured boot operation of the processor; and
    transmitting the first signal to the processor.

2. The method of claim 1, wherein the first signal is generated in response to a matching comparison operation performed on the first validation value computed and the first pre-computed validation value.

3. The method of claim 1, further comprising:
    receiving, at the NVM device during a configuration phase, the first code;
    calculating, using the cryptographic accelerator, the first pre-computed validation value based on the first code received;
    encrypting and storing the first code in the first storage region and the first pre-computed validation value in the second storage region.

4. The method of claim 1, wherein the calculating the first validation value includes at least one of hash values calculation, cyclic redundancy check (CRC) values calculation, keyed-hash message authentication codes (HMACs) calculation.

5. The method of claim 1, further comprising:
    transmitting, after the secured boot operation of the processor is initiated, a reset signal from the NVM device to the processor to stall and allow the NVM device to manage the secured boot operation.

6. The method of claim 5, wherein the first signal is a trigger signal configured to cancel a reset state of the processor caused at least partly by the reset signal.

7. The method of claim 1, further comprising:
    retrieving a second code stored in a third storage region of the NVM device, wherein the second code is associated with the secured boot operation;
    computing, using the cryptographic accelerator, a second validation value based on the second code retrieved;
    retrieving a second pre-computed validation value from a fourth storage region of the NVM device, wherein the second pre-computed validation value is associated with the second code;
    implementing a comparison operation of the second validation value and the second pre-computed validation value;
    generating a second signal based on a result of the comparison operation, wherein the second signal enables the secured boot operation of the processor; and
    transmitting the second signal to the processor, wherein the first code includes an initial boot loader (IBL) and the second code includes a second-stage bootloader (SBL) associated with the secured boot operation of the processor.

8. The method of claim 1, wherein the processor is an application processor, and wherein the first code comprises a type of code selected from a group consisting of: a first stage of a boot loader, a second stage of the boot loader, and application code for the application processor.

9. The method of claim 1, wherein the NVM device is a secured memory device that includes a Root of Trust (ROT) for the processor.

10. A memory device, comprising:
    a secured nonvolatile memory comprising secured storage regions;
    a processing element, configured to:
        retrieve a first code from a first secured storage region; and
        implement a validation operation on the first code retrieved to generate a first validation value; and
    a controller, configured to:
        retrieve a first pre-computed validation value associated with the first code from a second secured storage region, the first code and the first pre-computed validation value being associated with a secured boot operation of a processor that is coupled to the memory device;
        implement a comparison operation based on a comparison of the first validation value and the first pre-computed validation value; and
        generate a trigger signal based on a result of the comparison operation, the trigger signal being provided to the processor enabling the secured boot operation of the processor.

11. The memory device of claim 10, wherein the trigger signal is generated in response to a matching comparison operation performed on the first computed validation value and the first pre-computed validation value.

12. The memory device of claim 10, wherein the processing element is further configured to implement encryption and decryption operations for data stored in the secured storage regions of the secured nonvolatile memory.

13. The memory device of claim 10, wherein the validation operation includes computation at least one of: a hash value, a cyclic redundancy check (CRC) value, and a keyed-hash message authentication code (HMAC) value.

14. The memory device of claim 10, wherein the controller is further configured to:
    transmitting, after the secured boot operation of the processor is initiated, a reset signal to the processor to stall and allow the memory device to manage the secured boot operation; and
    transmitting the trigger signal to the processor to cancel a reset state of the processor caused at least partly by the reset signal.

15. The memory device of claim 10 is a secured memory device that includes a Root of Trust (ROT) for the processor.

16. The memory device of claim 10, wherein the controller is further configured to:
generate a notification message in response to a non-matching comparison operation performed on the first validation value and the first pre-computed validation value, wherein the notification message is provided to the processor, instead of the trigger signal, to terminate the secured boot operation.

17. A system, comprising:
multiple processors;
a memory device, comprising:
secured storage regions;
a processing element, configured to:
retrieve a first boot code from a first secured storage region; and
implement a validation operation on the first boot code retrieved to generate a first validation value; and
a controller, configured to:
retrieve a first pre-computed validation value associated with the first boot code from a second secured storage region, the first boot code and the first pre-computed validation value being associated with a secured boot operation of one of the multiple processors;
implement a comparison operation based on a comparison of the first validation value and the first pre-computed validation value; and
generate a trigger signal based on a result of the comparison operation, the trigger signal being provided to a first processor of the multiple processors enabling the secured boot operation therein; and
an interface comprising a plurality of general purpose input/output (GPIO) pins wherein each GPIO pin couples one processor of the multiple processors to the memory device.

18. The system of claim 17, wherein the controller is further configured to:
transmit an additional trigger signal via the interface, the additional trigger signal being transmitted to a second processor of the multiple processors enabling the secured boot operation therein.

19. The system of claim 17, wherein the controller is further configured to:
transmit an additional trigger signal via the interface, the additional trigger signal being transmitted to the first processor, wherein the trigger signal validate an initial boot loader (IBL) of the secured boot operation of the first processor, and the additional trigger signal validates a second-stage bootloader (SBL) of the secured boot operation of the first processor.

20. The system of claim 17, wherein during a configuration phase of the memory device, boot codes associated with secured boot operations of at least some of the multiple processors and their corresponding pre-computed validation values are encrypted and stored in the secured storage regions of the memory device.

* * * * *